US011336928B1

(12) United States Patent
Thornberry et al.

(10) Patent No.: US 11,336,928 B1
(45) Date of Patent: May 17, 2022

(54) PREDICTIVE CACHING OF IDENTICAL STARTING SEQUENCES IN CONTENT

(71) Applicant: Amazon Technologies, Inc., Seattle, WA (US)

(72) Inventors: Kevin Joseph Thornberry, London (GB); Piers George Cowburn, London (GB); Olivier Georget, London (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1108 days.

(21) Appl. No.: 14/864,696

(22) Filed: Sep. 24, 2015

(51) Int. Cl.
*H04N 21/231* (2011.01)
*H04N 21/239* (2011.01)
*H04N 21/234* (2011.01)
*H04N 21/25* (2011.01)

(52) U.S. Cl.
CPC ... *H04N 21/23106* (2013.01); *H04N 21/2393* (2013.01); *H04N 21/23418* (2013.01); *H04N 21/251* (2013.01)

(58) Field of Classification Search
CPC .......... H04N 21/251; H04N 21/25891; H04N 21/26258; H04N 21/262; H04N 21/274; H04N 21/2747; H04N 21/4332; H04N 21/4335; H04N 21/44004; H04N 21/44008; H04N 21/4532; H04N 21/45; H04N 21/466; H04N 21/4668; H04N 21/47202; H04N 21/4755; H04N 21/4756; H04N 21/4825; H04N 21/4826; H04N 21/4828; H04N 21/6581
USPC ....................................................... 386/353
See application file for complete search history.

(56) References Cited

U.S. PATENT DOCUMENTS

| 5,386,493 | A | * | 1/1995 | Degen ................. G10H 1/0033 704/260 |
| 5,953,485 | A | * | 9/1999 | Abecassis .......... H04N 7/17318 348/E5.102 |
| 6,016,520 | A | | 1/2000 | Facq et al. |
| 6,504,990 | B1 | * | 1/2003 | Abecassis .......... H04N 5/44543 348/E5.105 |
| 6,571,279 | B1 | | 5/2003 | Herz et al. |
| 6,671,424 | B1 | | 12/2003 | Skoll et al. |
| 6,766,376 | B2 | | 7/2004 | Price |
| 7,298,930 | B1 | * | 11/2007 | Erol .................... G06K 9/00711 382/305 |
| 7,403,618 | B2 | | 7/2008 | Van Rijnsoever et al. |
| 7,565,399 | B1 | | 7/2009 | Goel |
| 7,630,986 | B1 | | 12/2009 | Herz et al. |

(Continued)

OTHER PUBLICATIONS

U.S. Appl. No. 61/683,187 entitled "Speculative Pre-Authorization of Encrypted Data Streams" and filed on Aug. 14, 2012.

(Continued)

*Primary Examiner* — An Son P Huynh
(74) *Attorney, Agent, or Firm* — Thomas | Horstemeyer, LLP.

(57) ABSTRACT

Disclosed are various embodiments for predictive caching of identical starting sequences in content. A content item library is scanned to identify an initial portion shared by multiple content items. The initial portion is extracted from a first content item. It is determined that a second content item is to be predictively cached by a client. The initial portion of the first content item is sent to the client in place of the initial portion of the second content item.

20 Claims, 8 Drawing Sheets

(56) References Cited

U.S. PATENT DOCUMENTS

| | | | |
|---|---|---|---|
| 7,761,892 B2 * | 7/2010 | Ellis | H04N 5/44543 725/39 |
| 7,941,092 B2 | 5/2011 | Rao | |
| 8,078,096 B2 | 12/2011 | Rao | |
| 8,172,557 B2 | 5/2012 | Hilger et al. | |
| 8,180,276 B2 | 5/2012 | Rao | |
| 8,209,729 B2 * | 6/2012 | Phillips | G06Q 30/02 725/87 |
| 8,385,813 B2 | 2/2013 | Rao | |
| 8,489,673 B2 | 7/2013 | Sebastian et al. | |
| 8,745,158 B2 | 6/2014 | Claman et al. | |
| 8,898,708 B2 | 11/2014 | Rao | |
| 9,264,508 B2 * | 2/2016 | Wolf | H04L 67/2842 |
| 9,369,289 B1 * | 6/2016 | Harrison | H04L 9/0822 |
| 10,055,601 B1 * | 8/2018 | Hamid | H04L 9/0894 |
| 10,263,968 B1 * | 4/2019 | Ashminov | H04L 9/0656 |
| 2002/0069132 A1 | 6/2002 | Perkes et al. | |
| 2002/0071052 A1 * | 6/2002 | Itoh | H04N 7/17318 348/384.1 |
| 2002/0174430 A1 * | 11/2002 | Ellis | G11B 27/005 725/46 |
| 2003/0007776 A1 * | 1/2003 | Kameyama | H04N 5/76 386/226 |
| 2003/0046638 A1 * | 3/2003 | Thompson | G11B 27/105 709/231 |
| 2004/0123324 A1 * | 6/2004 | Sazzad | H04N 7/17318 725/89 |
| 2004/0252967 A1 | 12/2004 | Sheu et al. | |
| 2005/0166257 A1 * | 7/2005 | Feinleib | H04N 7/163 725/136 |
| 2006/0062363 A1 | 3/2006 | Albrett | |
| 2006/0064383 A1 * | 3/2006 | Marking | G06Q 20/3829 705/57 |
| 2006/0069749 A1 | 3/2006 | Herz et al. | |
| 2007/0061265 A1 * | 3/2007 | Hovnanian | G07F 17/16 705/51 |
| 2007/0179854 A1 | 8/2007 | Ziv et al. | |
| 2007/0223871 A1 * | 9/2007 | Thelen | G11B 27/105 386/280 |
| 2008/0095370 A1 | 4/2008 | Rose et al. | |
| 2008/0119132 A1 | 5/2008 | Rao | |
| 2008/0270579 A1 | 10/2008 | Herz et al. | |
| 2008/0282301 A1 * | 11/2008 | Liu | H04N 7/17318 725/100 |
| 2008/0310815 A1 | 12/2008 | He et al. | |
| 2009/0049503 A1 * | 2/2009 | Inoue | H04N 5/44 725/139 |
| 2009/0254971 A1 | 10/2009 | Herz et al. | |
| 2009/0288112 A1 | 11/2009 | Kandekar et al. | |
| 2009/0288131 A1 | 11/2009 | Kandekar et al. | |
| 2010/0058405 A1 * | 3/2010 | Ramakrishnan | H04N 7/17318 725/97 |
| 2010/0138865 A1 | 6/2010 | Rai et al. | |
| 2010/0153885 A1 * | 6/2010 | Yates | G06F 3/0482 715/841 |
| 2010/0169502 A1 * | 7/2010 | Knowlson | H04L 67/2847 709/231 |
| 2010/0251305 A1 | 9/2010 | Kimble et al. | |
| 2011/0047134 A1 | 2/2011 | Zhang et al. | |
| 2011/0078717 A1 * | 3/2011 | Drummond | H04N 21/4586 725/14 |
| 2011/0093900 A1 | 4/2011 | Patel et al. | |
| 2011/0103374 A1 | 5/2011 | Lajoie et al. | |
| 2011/0116719 A1 * | 5/2011 | Bilobrov | G06K 9/00711 382/217 |
| 2011/0177773 A1 | 7/2011 | Rao | |
| 2011/0197236 A1 | 8/2011 | Rao | |
| 2011/0202383 A1 | 8/2011 | Rao | |
| 2011/0239262 A1 * | 9/2011 | Yang | H04N 21/26616 725/109 |
| 2011/0246621 A1 * | 10/2011 | May, Jr. | H04N 7/17318 709/219 |
| 2012/0042050 A1 | 2/2012 | Chen et al. | |
| 2012/0133733 A1 * | 5/2012 | Sakaniwa | H04N 13/0025 348/43 |
| 2012/0252352 A1 | 10/2012 | Rao | |
| 2013/0031211 A1 | 1/2013 | Johnson et al. | |
| 2013/0031582 A1 * | 1/2013 | Tinsman | H04N 21/2353 725/36 |
| 2013/0091515 A1 * | 4/2013 | Sakata | H04N 21/23439 725/10 |
| 2013/0259442 A1 * | 10/2013 | Bloch | H04N 21/23439 386/230 |
| 2014/0059156 A1 * | 2/2014 | Freeman, II | H04L 67/10 709/213 |
| 2014/0064711 A1 * | 3/2014 | Ziskind | H04N 5/76 386/353 |
| 2014/0283130 A1 * | 9/2014 | Sagebin | H04L 63/10 726/28 |
| 2014/0325555 A1 * | 10/2014 | Khader | H04N 21/2668 725/32 |
| 2015/0325268 A1 * | 11/2015 | Berger | H04N 21/2358 386/248 |
| 2015/0341611 A1 * | 11/2015 | Oh | H04N 9/8722 386/230 |
| 2016/0094875 A1 * | 3/2016 | Peterson | H04N 21/44016 725/41 |

OTHER PUBLICATIONS

International Searching Authority and Written Opinion dated Mar. 13, 2014 for PCT/US2013/055980 filed Aug. 21, 2013.

U.S. Appl. No. 14/274,121 entitled "Client-Side Predictive Caching for Content" and filed on May 9, 2014.

* cited by examiner

PREDICTIVE CACHING OF IDENTICAL STARTING SEQUENCES IN CONTENT

BACKGROUND

Network-based delivery of media content has largely supplanted other forms of media content delivery, such as brick-and-mortar video sales and rental stores, mail-based video rental services, and so on. Instead of traveling a few miles to a physical store or waiting days for a title to arrive by mail, users may select media content titles to stream to their devices over high-speed broadband connections. Consequently, users are quickly growing accustomed to near-immediate delivery of media content. Rising user expectations may lead to frustration when playback does not begin immediately upon user selection of a media content title.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to predictive caching for content items such as, for example, movies, television programs, music, video clips, audio clips, applications, and so on. Such content is increasingly offered through network streaming or progressive download. If the network connection of the user has bandwidth exceeding the bitrate of the content, the content can be played back or otherwise used while it is being downloaded or streamed. Despite having the network bandwidth to support streaming, users may still experience delay after initially selecting a content item for use. For example, playback may be delayed for several seconds, leading to user frustration. This delay may be due to the initial filling of buffers in the client with portions of the content item; launching and initializing various software and/or hardware components in the client to perform decryption, decoding, or other functions; or other causes.

Various approaches to predictive caching are described in U.S. patent application Ser. No. 13/592,752 entitled "PREDICTIVE CACHING FOR CONTENT" and filed on Aug. 23, 2012, and U.S. patent application Ser. No. 14/274,121 entitled "CLIENT-SIDE PREDICTIVE CACHING FOR CONTENT" and filed on May 9, 2014, which are incorporated herein by reference in their entirety. Such approaches enable instantaneous, or near instantaneous, playback of network-streamed or progressively downloaded content by predictively caching initial portions of content items that a user is likely to play back or use. The predictive caching may involve downloading initial portions of the content item in advance, downloading metadata including manifest files and decryption keys, decrypting the initial portions of the content items, performing configuration tasks, performing initialization tasks, and/or performing other tasks relating to preparing a content item for playback.

Embodiments of the present disclosure further improve predictive caching approaches by recognizing that many content items share identical starting sequences. As an example, each episode of a particular season of a television series may begin with the same fifteen seconds of content as an introduction. As another example, each movie released by a particular movie studio may begin with the same twenty-two second introduction promoting the particular movie studio. Rather than predictively caching these starting sequences separately for each content item, distinct starting sequences may be cached only once, thereby reducing the size of the predictive cache or facilitating predictive caching of additional content items within the same amount of data storage.

Figure 1A:
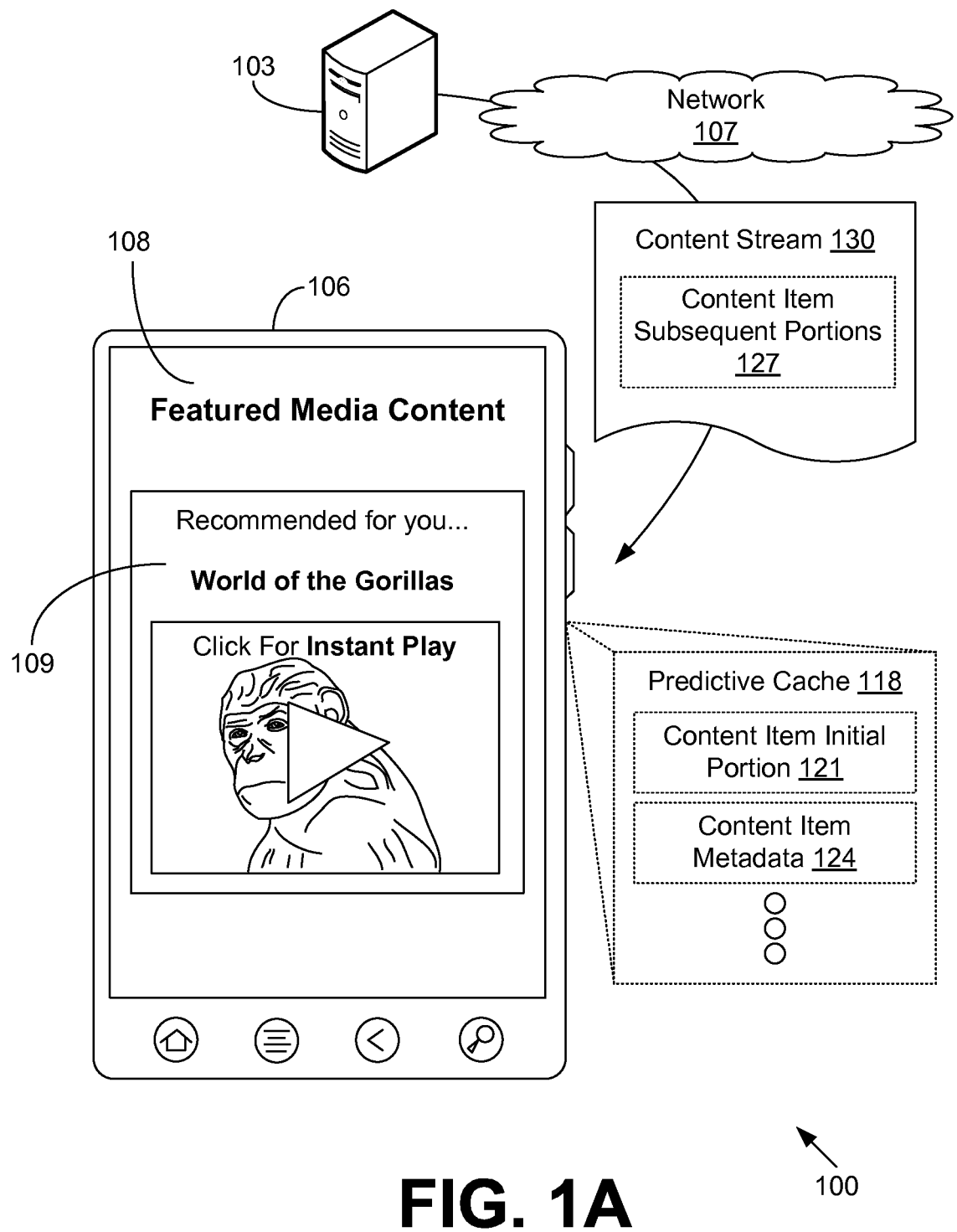
FIG. 1A is a drawing presenting one example of operation of a networked environment according to various embodiments of the present disclosure.

With reference to FIG. 1A, shown is one example of operation for a networked environment 100 according to various embodiments. The networked environment 100 includes a computing environment 103 in data communication with one or more clients 106 via a network 107. The client 106 is rendering a user interface 108 that allows a user to browse content items that are available for playback or use. A recommendation 109 is rendered in the user interface 108 in this non-limiting example. The recommendation 109 recommends to the user a movie ("World of the Gorillas") that has been predictively cached in the client 106 for instantaneous playback.

The client 106 includes a predictive cache 118 in memory that stores a content item initial portion 121 and content item metadata 124 for each predictively cached content item. Through predictive caching, the client 106 is configured to obtain the content item initial portion 121 and the content item metadata 124 from the computing environment 103 over the network 107 before the user at the client 106 requests use or playback of the content item. Further, the client 106 may initialize various software and/or hardware components based at least in part on the content item initial portion 121 and/or the content item metadata 124 in order to provide an instantaneous use experience when the user selects the content item for use.

After the user requests use of the content item, the client 106 may then begin to obtain content item subsequent portions 127 in a content stream 130 over the network 107 from the computing environment 103. Thus, as the client 106 exhausts use of the content item initial portion 121, the client 106 may seamlessly continue use of the content item subsequent portions 127. In the following discussion, a general description of the system and its components is provided, followed by a discussion of the operation of the same.

Figure 1B:
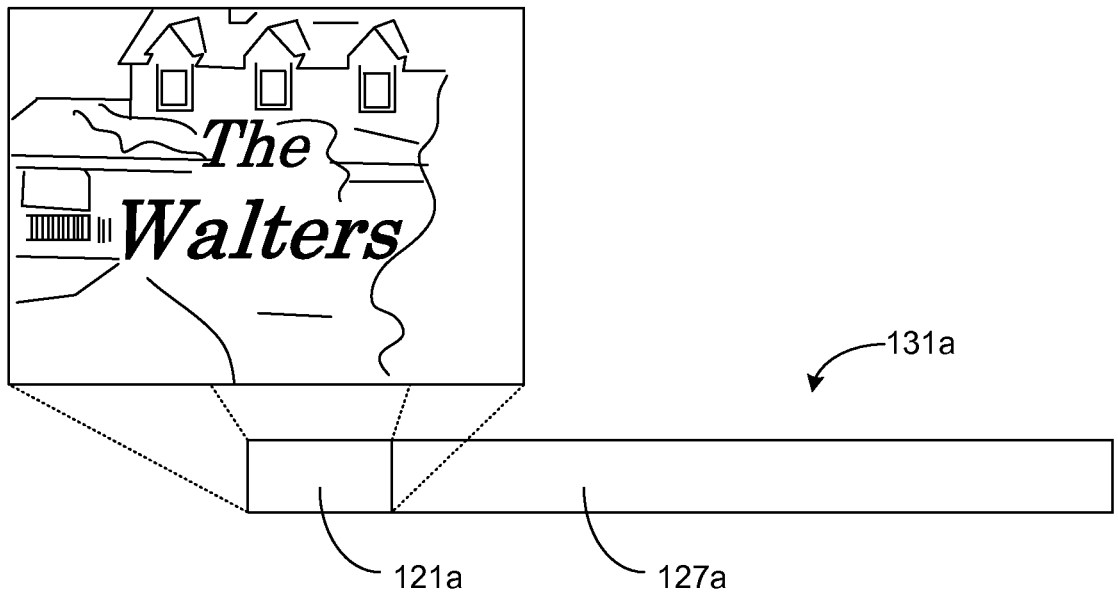
FIG. 1B is a drawing presenting an example scenario involving detection of identical starting sequences in content according to various embodiments of the present disclosure.
Figure 1B:
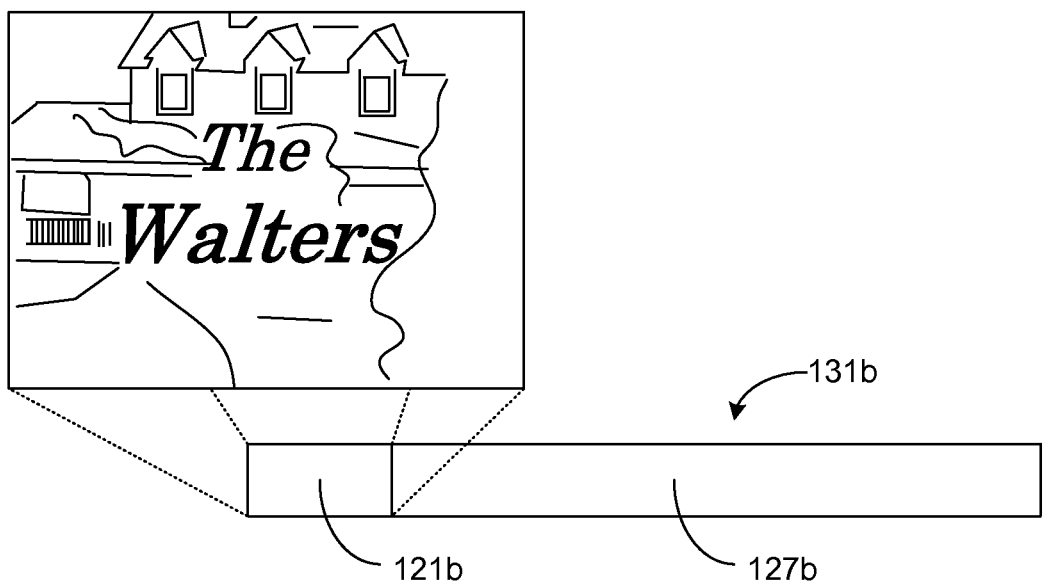

Continuing to FIG. 1B, shown is an example scenario involving detection of identical starting sequences in content according to various embodiments. Representations of two different content items 131*a* and 131*b* are shown. Each of these content items 131*a* and 131*b* correspond to different episodes of a particular season of a television series titled "The Walters." Both content items 131*a* and 131*b* share the same introductory sequence, which may, for example, introduce the name of the series and the cast and characters. Accordingly, the content item initial portions 121*a* and 121*b* may be the same for both content items 131*a* and 131*b*. However, it would be expected that the content item subsequent portions 127*a* and 127*b* would differ, reflecting the episodes' unique content.

Realizing that the content item initial portions 121*a* and 121*b* are the same, the client 106 may predictively cache a copy of only one of the content item initial portions 121*a* or 121*b*, thereby reducing space requirements for the predictive cache in the client 106. Alternatively, the client 106 may enable predictive caching of additional titles given this improved efficiency.

It is noted that the introductory sequence that is shared among the content items 131*a* and 131*b* need not be contiguous to the content item initial portions 121*a* and 121*b*. For example, the size of the content item initial portions 121*a* and 121*b* used for predictive caching may be the minimum necessary to facilitate instantaneous playback (i.e., an amount of content to be played out while a buffer is filled via the network 107 (FIG. 1A)), which may be a lesser amount than the entire introductory sequence shared among the content items 131*a* and 131*b*.

Conversely, in some cases, the introductory sequence may be shorter than the minimum length necessary to facilitate instantaneous playback. In such cases, a subsequent unique portion of the content items 131*a* and 131*b* may be additionally predictively cached. Even in such cases, efficiencies may be gained by avoiding duplicative predictive caching of shared introductory sequences.

Figure 1C:
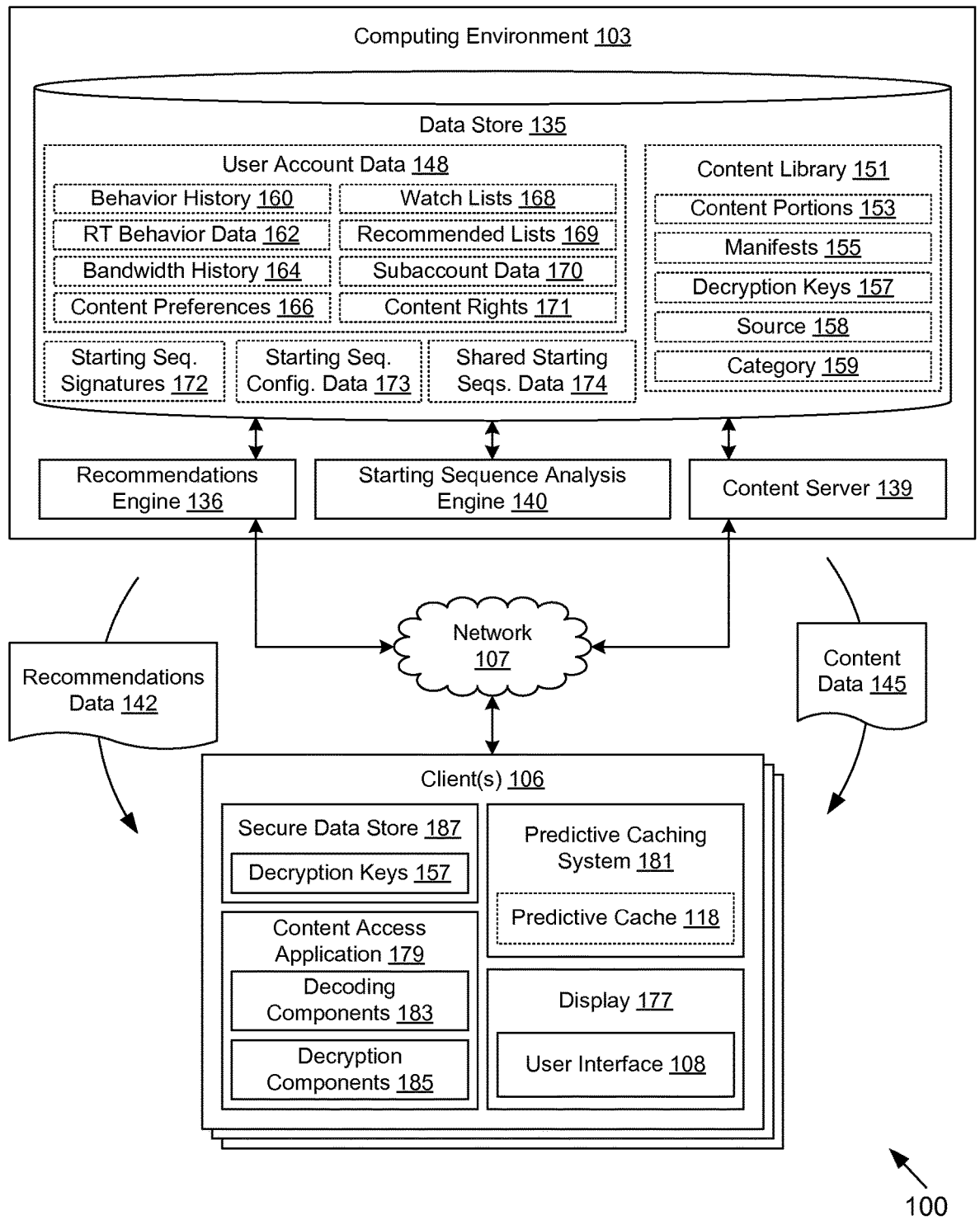
FIG. 1C is a drawing presenting a detailed view of the networked environment of FIG. 1A according to various embodiments of the present disclosure.

Turning now to FIG. 1C, shown is a detailed view of the networked environment 100 according to various embodiments. The networked environment 100 includes the computing environment 103 in data communication with one or more clients 106 via the network 107. The network 107 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, a content delivery network, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 135 that is accessible to the computing environment 103. The data store 135 may be representative of a plurality of data stores 135 as can be appreciated. The data stored in the data store 135, for example, is associated with the operation of the various applications and/or functional entities described below.

The components executed on the computing environment 103, for example, include a recommendations engine 136, a content server 139, a starting sequence analysis engine 140, and other applications, services, processes, systems, engines, or functionality not discussed in detail herein. The recommendations engine 136 is executed to generate a list of recommended content for a user. To this end, the recommendations engine 136 may analyze various behavioral data collected regarding the user. The list of recommended content corresponds to content that the user is likely to playback or consume. The list may include relative priorities for the recommended content. The list may be sent to the client 106 over the network 107 as recommendations data 142.

The content server 139 is executed to serve up content items and associated data to users at clients 106. To this end, the content server 139 is configured to send content data 145 to the client 106 via the network 107. In addition, the content server 139 may generate and send user interface data to the client 106 to facilitate user browsing, searching, and/or selection of content. Such user interface data may correspond to web page data, mobile application data, and/or other forms of user. Such user interface data may include hypertext markup language (HTML), extensible markup language (XML), cascading style sheets (CSS), and/or other data. In one embodiment, the content server 139 may send directives to the client 106 that instruct the client 106 to predictively cache preselected content items.

The starting sequence analysis engine 140 is configured to analyze content items to determine whether two or more content items share a common introduction or starting sequence. In various embodiments, the starting sequence analysis engine 140 may analyze all content items in a library via comparison with one another or may limit the universe of comparisons based at least in part on various metadata indicating source or type of content.

The data stored in the data store 135 includes, for example, user account data 148, a content library 151, and potentially other data. The content library 151 includes data relating to content items that are made available by the content server 139 for playback, download, viewing, lease, purchase, etc. Such content items may include, for example, movies, television shows, music, music videos, video clips, audio clips, applications such as mobile applications, and so on. The content library 151 may include content portions 153, metadata such as manifests 155, decryption keys 157, source 158, category 159, and/or other data.

Each of the content portions 153 may correspond to a distinct time segment of the particular content item. In some cases, multiple alternative content portions 153 may be provided for time segments, e.g., both English and Spanish language audio tracks, different bitrates with different encoding qualities, and so on. The content portions 153 may include Moving Pictures Experts Group (MPEG) video data, H.264 data, Flash® media data, MPEG layer 3 (MP3) audio data, Dolby Digital® audio data, Advanced Audio Coding (AAC) audio data, data for subtitles, etc.

The manifests 155 may describe, for example, how a particular content item is made up of various content portions 153. The manifest 155 may include identifiers for content portions 153 that make up the content item along with sequence-specifying data so that the client 106 can obtain and render the content portions 153 in the correct order. The manifest 155 may also identify various alternative content portions 153 for a content item such as, for example, alternative languages, alternative bitrates, and other alternatives. In some cases, the manifest 155 may provide license-related information, including the location of the decryption keys 157.

The decryption keys 157 may be employed by the client 106 to decrypt content portions 153 which are encrypted under digital rights management (DRM) technologies. A decryption key 157 may be sent along with the content portions 153 if the client 106 has rights to the corresponding content item. The rights to the corresponding content item may expire at a particular time, after a time period, upon a certain number of plays for the content item, or at some other time. Thus, the decryption keys 157 may be configured to expire in response to expiration of the rights of the client 106 to the corresponding content item. In some embodiments, the decryption keys 157 may be referred to as "licenses" for the corresponding content items.

The source 158 may identify a particular source entity for a content item, such as a content producer, movie studio, television network, director, production entity, distribution entity, and/or other entities. It is noted that a given content item may be associated with multiple sources 158. In some cases, particular sources 158 may be associated with shared starting sequences applied to their content items. In one scenario, a determination that a given source 158 is associated with shared starting sequences may be stored in association with the source 158 in the content library 151.

The category 159 may identify one or more classifications for a content item. For example, a category 159 may indicate that a content item is an episode of a particular video content series, e.g., a mini-series, a season of a series, etc. Content items classified within a common category 159 may be associated with shared starting sequences applied to their content items. In one scenario, a determination that a given category 159 is associated with shared starting sequences may be stored in association with the category 159 in the content library 151.

The user account data 148 may include various data associated with user accounts with the content server 139. Such accounts may be explicitly registered and configured by users or may be created implicitly based on client 106 interaction with the content server 139. The user account data 148 may include, for example, behavior history 160, real-time behavior data 162, bandwidth history 164, content preferences 166, watch lists 168, recommended lists 169, subaccount data 170, content rights 171, and other data. In addition, security credentials, contact information, payment instruments, and/or other user-related data may be stored in the user account data 148.

The behavior history 160 describes historical behavior of the user associated with the user account. Such behavior may include a content consumption history describing which content items the user has viewed, downloaded, purchased, etc. In one example, the content consumption history corresponds to a media consumption history indicating which media content items the user has viewed, downloaded, purchased, etc. Such behavior may also include a browse history tracking network pages or content the user has previously accessed, a search history tracking previous search queries, subscription history, purchase and browse history for non-content items, and/or other forms of online behavior.

The real-time behavior data 162 may include data describing what the user is currently doing, e.g., what content the user is currently browsing, what search queries the user is currently executing, what search results are being displayed to the user, etc. The real-time behavior data 162 may be observed by the content server 139 or collected from reports by the client 106. For example, the client 106 may be configured to report to the content server 139 that the user is hovering a cursor over a description of a certain content item in a user interface. In some embodiments, the real-time behavior data 162 may be maintained in the client 106 rather than the computing environment 103.

The bandwidth history 164 profiles the network bandwidth available for the user through the client 106. The bandwidth history 164 may be employed to select from among multiple bitrates of content items automatically for predictive caching. If the user employs multiple clients 106, multiple profiles may be created in the bandwidth history 164. Also, multiple location-dependent profiles may be created for clients 106 that are mobile devices. As a non-limiting example, a user may have third-generation (3G) cellular data access at an office location, but high-speed Wi-Fi data access at a home location, thereby resulting in multiple location-dependent bandwidth profiles for the same client 106 in the bandwidth history 164.

The content preferences 166 include various preferences inferred from user behavior or explicitly configured by users. Such preferences may relate to media content quality (e.g., bitrate, codec, etc.), language preferences, subtitle preferences, closed captioning preferences, supplemental content preferences (e.g., relating to directors' or actors' commentaries, etc.), parental control preferences, and so on. The watch lists 168 may correspond to lists of content items in which users have explicitly indicated that they desire to consume the content at some time in the future. The recommended lists 169 correspond to lists of recommended content items generated for each user by the recommendations engine 136.

The subaccount data 170 may be employed to describe preferences or behaviors that differ across multiple users of a user account. For instance, a family may have a single user account but subaccounts for each member of the family. Each user may explicitly log in to a subaccount, or the subaccount may be inferred based on time of day, day of the week, identity or type of the client 106, location of the client 106, and/or other factors. In some cases, one user may be associated with multiple subaccounts. Further, a subaccount may be associated with multiple users. The subaccount data 170 may specify restrictions on content access in some cases. As a non-limiting example, a subaccount for a child may be limited to access only child-friendly content from approved sources. In some cases, different subaccounts may be associated with different clients 106.

The content rights 171 may describe the rights to content which are associated with the user account. For example, a user may have a subscription to certain content or all content available through the content server 139. Such a subscription may be for indefinite use of the accessed content, time-limited use, device-limited use, and/or other licensing arrangements. Alternatively, a user may purchase or lease content on a per-content-item basis.

The data store 135 may also store starting sequence signatures 172, starting sequence configuration data 173, and shared starting sequences data 174 relating to starting sequences that may be shared for multiple content items. The starting sequence signatures 172 may include signatures or profiles for shared starting sequences that have already been recognized by the starting sequence analysis engine 140. The starting sequence signatures 172 may be employed to quickly evaluate and determine whether the initial portions of a given content item have the same characteristics as a previously recognized starting sequence.

The starting sequence configuration data 173 may configure the operation of the starting sequence analysis engine 140. For example, the starting sequence configuration data 173 may configure which types of content items will be compared to identify shared starting sequences. The starting sequence configuration data 173 may also configure a fuzzy matching logic of the starting sequence analysis engine 140. Although two content items may share a starting sequence, a byte-by-byte comparison rarely may yield a match due to slight differences in encoding. The starting sequence configuration data 173 may configure how closely two content items will have to compare in order to recognize a match.

The shared starting sequence data 174 is metadata that identifies content portions 153 that correspond to shared starting sequences that have been identified. In this regard, the shared starting sequence data 174 may indicate, for a given shared starting sequence, which content items use that shared starting sequence. Similarly, the shared starting sequence data 174 may indicate for a given content item, whether a shared starting sequence has been detected, and what content portions 153 correspond to the detected shared starting sequence.

The client 106 is representative of a plurality of client devices that may be coupled to the network 107. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 177. The display 177 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as a content access application 179, a predictive caching system 181, and/or other applications. The content access application 179 may be executed in the client 106, for example, to access and render content items from the computing environment 103 and/or other servers. Moreover, the content access application 179 may access various other network content served up by the computing environment 103 and/or other servers, thereby rendering a user interface 108 on the display 177. The content access application 179 may provide various media player functionality including, for example, initiating playback, stopping playback, pausing playback, adjusting volume, setting preferences, browsing for media content, searching for media content, recommending media content by rendering recommendations 109 (FIG. 1A), and so on. The content access application 179 may include various decoding components 183 and decryption components 185 corresponding to logic that facilitates playback of content items. Where the content corresponds to applications, the content access application 179 may facilitate progressive download and execution of applications.

The predictive caching system 181 is executed to predict various content items that the user is likely to access and to cache content item initial portions 121 (FIG. 1A) and content item metadata 124 (FIG. 1A) in the predictive cache 118 to facilitate instantaneous use. The predictive caching system 181 may also initialize various decoding components 183, decryption components 185, etc. for content items in the predictive cache 118. The size of the predictive cache 118 may depend, for example, on user-configured parameters, the available data storage in the client 106, the bandwidth available to the client 106 over the network 107, or on other factors. In various embodiments, the client 106 may be configured to make predictive caching decisions or the computing environment 103 may be configured to make predictive caching decisions.

The client 106 may also include a secure data store 187 for storage of decryption keys 157 used in decrypting content items to which the user has rights in the client 106. The secure data store 187 may comply with various rules regarding security for storage of DRM licenses. The secure data store 187 may have relatively limited storage space for decryption keys 157. In some cases, the limited storage space in the secure data store 187 may in turn limit the size of the predictive cache 118. The predictive caching system 181 may be configured to install the decryption keys 157 in the secure data store 187 which the corresponding content items are predictively cached. The client 106 may be configured to execute applications beyond the content access application 179 and the predictive caching system 181 such as, for example, browsers, mobile applications, email applications, social networking applications, and/or other applications.

Next, a general description of the operation of the various components of the networked environment 100 is provided. To begin, users may register and interact with the content server 139 such that behavior history 160 (e.g., consumption history, etc.), bandwidth history 164, content preferences 166, watch lists 168, and/or other data in the user account data 148 is created for a content access account. The recommendations engine 136 may process this data in order to generate the recommended lists 169 for the users. In some cases, the recommended lists 169 may be based on real-time behavior data 162 associated with the users. Such real-time behavior data 162 may, for example, describe a listing of content items being presented to the user in a user interface, a listing of search results generated in response to a search query obtained from the user, and so on. The recommended lists 169 may depend further on the time of day, the day of the week, which subaccount is active, etc.

The recommended lists 169 and/or other data used to generate recommendations may be sent to the client 106 as recommendations data 142. From a list of recommended content items, the predictive caching system 181 selects a subset of the list based at least in part on a respective priority of the content items, an available data storage for the client 106, available storage in the secure data store 187, available bandwidth, power state in the client 106, costs associated with the network 107 connection to the client 106, type of network 107 connection to the client 106, configuration parameters, and/or other factors. In some cases, a predictive caching system 181 may be configured to prefer content items having shared starting sequences, as predictively caching for just one content item may result in effectively predictively caching for many different content items that share the starting sequence. In one embodiment, the predictive caching system 181 determines the selected subset according to a directive from the computing environment 103.

The predictive caching system 181 proceeds to predictively cache the content items in the selected subset. In doing so, the predictive caching system 181 may prepare the client 106 for instantaneous use or playback of the selected subset of content items before the user selects any of the selected subset of content items for use. To this end, the predictive caching system 181 may obtain initial portions from the content portions 153 and metadata such as manifests 155 and decryption keys 157 from the content server 139.

The content portions 153 may be sent in a decrypted format. To handle this, the predictive caching system 181 may obtain decryption keys 157, which are then installed in the secure data store 187 to handle the decryption. The predictive caching system 181 may spin up and initialize hardware and/or software resources of the client 106, to include, for example, decoding components 183, decryption components 185, and other components of the content access application 179. Thus, the predictive caching system 181 may perform some processing relative to the metadata and/or the initial portion of the content item in order to prepare the client 106 for instantaneous playback of the predictively cached content items prior to the user explicitly indicating that use or playback is desired.

Instantaneously available use may then be provided by the content access application 179 when any of the selected subset of content items is selected for use or playback by the user. The content access application 179 is configured to stream the selected content item from the content server 139 as a content stream 130. Although described as "instantaneous" playback, it is understood that such playback may include a fade transition or other transition in order to avoid a jarring experience of cutting directly to playback.

Figure 2:
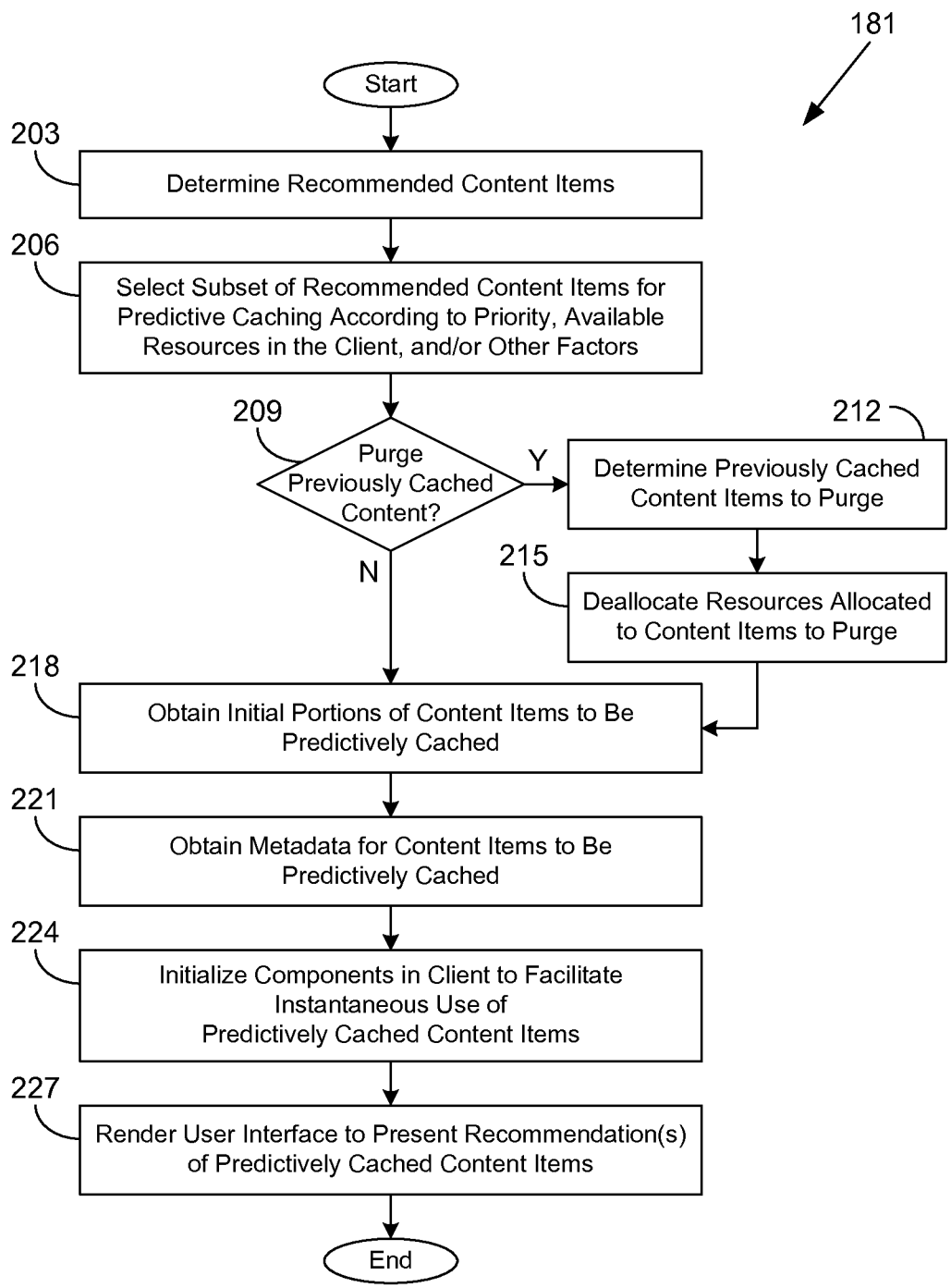
FIG. 2 is a flowchart illustrating one example of functionality implemented as portions of a predictive caching system executed in a client in the networked environment of FIG. 1C according to various embodiments of the present disclosure.

Referring next to FIG. 2, shown is a flowchart that provides one example of the operation of a portion of the predictive caching system 181 according to various embodiments. It is understood that the flowchart of FIG. 2 provides merely an example of the many different types of functional arrangements that may be employed to implement the operation of the portion of the predictive caching system 181 as described herein. As an alternative, the flowchart of FIG. 2 may be viewed as depicting an example method implemented in the client 106 (FIGS. 1A & 1C) according to one or more embodiments.

Beginning with box 203, the predictive caching system 181 determines a list of recommended content items. To this end, the predictive caching system 181 may obtain recommendations data 142 (FIG. 1C) from the computing environment 103 (FIG. 1C). Such recommendations data 142 may be generated based at least in part on, for example, behavior history 160 (FIG. 1C) including content consumption history, content preferences 166 (FIG. 1C), real-time behavior data 162 (FIG. 1C), and/or other data. In some embodiments, the predictive caching system 181 may generate at least a part of the list of recommended content items from real-time behavior data 162 available in the client 106. The list of recommended content items may have a priority associated with each content item in the list. Such a priority may indicate a relative likelihood that the user will want to consume the particular content item.

In box 206, the predictive caching system 181 selects a subset of the list of recommended content items to be predictively cached. The selection may be driven by priority of the respective content items, available resources in the client 106 (e.g., available memory or data storage allocated for the predictive cache 118 (FIGS. 1A & 1C), available storage in the secure data store 187 (FIG. 1C), available bandwidth on the network 107 (FIGS. 1A & 1C) for the client 106, bandwidth history 164 (FIG. 1C), content preferences 166 (FIG. 1C), real-time behavior data 162 available to the client 106, configuration parameters, and/or other factors. In some cases, the selection may be based further in part on whether a recommended content item has a shared starting sequence.

In box 209, the predictive caching system 181 determines whether previously cached content from the predictive cache 118 is to be purged. Such content may be purged in order to free up resources for other content that is determined to be more likely to be consumed by the user. The previously cached content may also be rendered obsolete by a change to the factors which prompted its initial selection to be predictively cached, e.g., if the content is no longer timely, if the real-time behavior of the user that prompted the predictive caching of the content has changed, if the user has completed consuming the content, and so on. In some cases, the user may explicitly request that content be purged from the cache. However, it is noted that shared starting sequences may be retained in the cache if other recommended content items that may be viewed later also use the shared starting sequences.

If previously cached content is to be purged, the predictive caching system 181 moves from box 209 to box 212 and determines which of the previously cached content items are to be purged. In some cases, the user may explicitly identify which content is to be purged. In box 215, the predictive caching system 181 deallocates resources in the client 106 that had been allocated to the content items that are to be purged. In doing so, the predictive caching system 181 may, for example, remove content item initial portions 121 (FIG. 1A) from the predictive cache 118, remove content item metadata 124 (FIG. 1A) from the predictive cache 118, remove unnecessary decryption keys 157 (FIG. 1C) from the secure data store 187, terminate unnecessary decoding components 183 (FIG. 1C) or decryption components 185 (FIG. 1C), and so on. The predictive caching system 181 then proceeds to box 218. If the predictive caching system 181 instead decides not to purge previously cached content, the predictive caching system 181 moves from box 209 to box 218.

In box 218, the predictive caching system 181 obtains content item initial portions 121 from the content server 139 (FIG. 1C) for the content items that are to be predictively cached. The initial portions may correspond to the beginning of the content item, a location where the user left off in consuming the content item, a popular location within the content item, and/or other starting portions within the content item. In some cases, initial portions may have been extracted from other content items that are determined to share the same initial portions, e.g., in the case of a shared starting sequence. In box 221, the predictive caching system 181 obtains content item metadata 124 for the content items that are to be predictively cached. Such content item metadata 124 may include, for example, manifests 155 (FIG. 1C), decryption keys 157, and/or other metadata. In box 224, the predictive caching system 181 initializes various components in the client 106 to facilitate instantaneous use or playback of the predictively cached content items. This may include, for example, launching and/or initializing decoding components 183 and/or decryption components 185, storing decryption keys 157 in the secure data store 187, and/or performing other tasks.

In box 227, the predictive caching system 181 may render a user interface 108 (FIGS. 1A & 1C) to present recommendations 109 (FIG. 1A) of predictively cached content items. By recommending such predictively cached content items, the likelihood that the user will select content that has been predictively cached may be increased, thereby increasing the likelihood of a positive user experience resulting from instantaneous use. Thereafter, the portion of the predictive caching system 181 ends.

Figure 3:
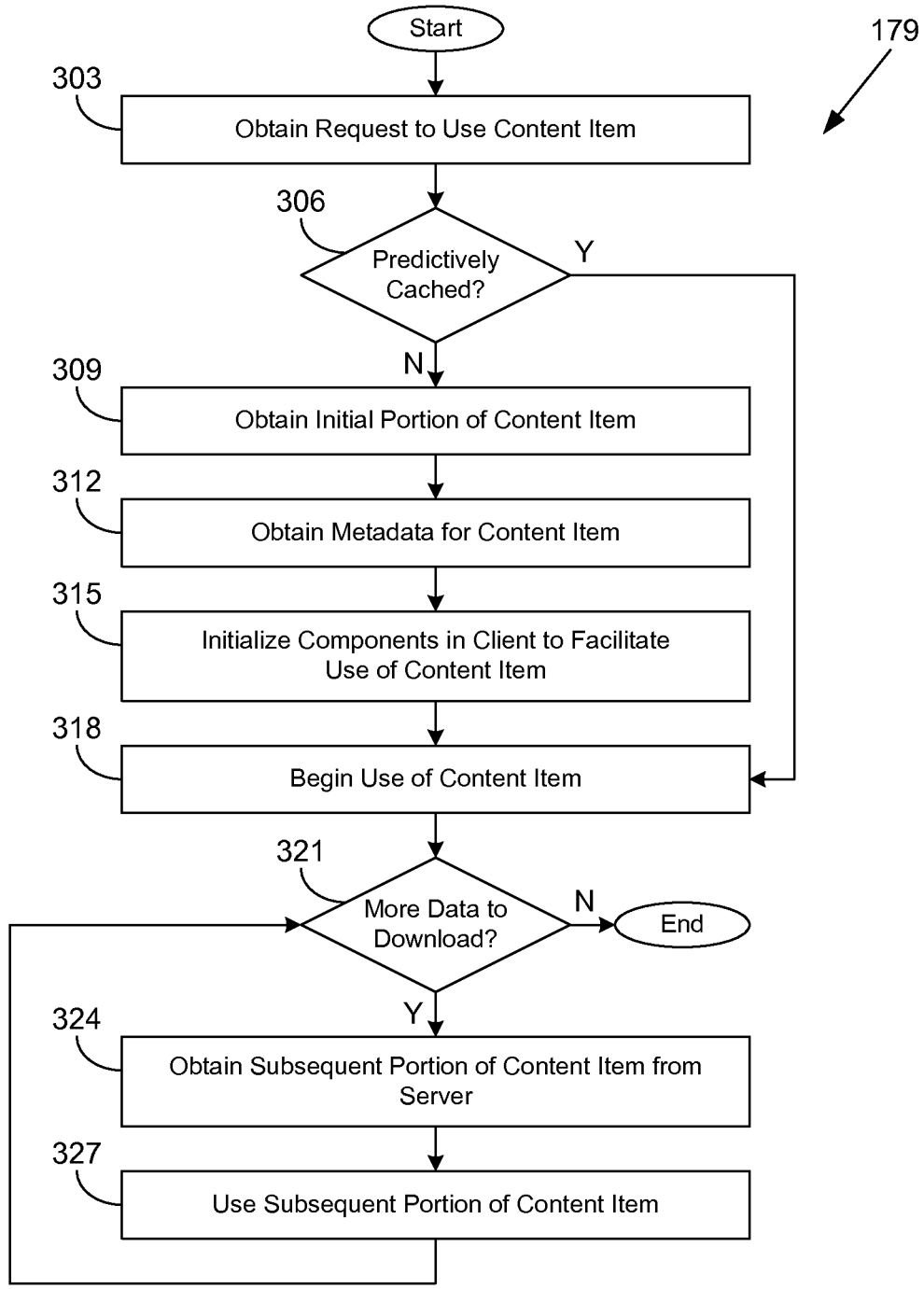
FIG. 3 is a flowchart illustrating one example of functionality implemented as portions of a content access application executed in a client in the networked environment of FIG. 1C according to various embodiments of the present disclosure.

Turning now to FIG. 3, shown is a flowchart that provides one example of the operation of a portion of the content access application 179 according to various embodiments. It is understood that the flowchart of FIG. 3 provides merely an example of the many different types of functional arrangements that may be employed to implement the operation of the portion of the content access application 179 as described herein. As an alternative, the flowchart of FIG. 3 may be viewed as depicting an example method implemented in the client 106 (FIGS. 1A & 1C) according to one or more embodiments.

Beginning with box 303, the content access application 179 obtains a request to use a content item. For instance, a user may navigate to a user interface 108 (FIGS. 1A & 1C) that presents a content item, and the user may select a "play" button or other similar user interface component. In box 306, the content access application 179 determines whether the content item has been predictively cached in the client 106. If the content item has not been predictively cached in the client 106, or if the predictive caching is incomplete, the content access application 179 may continue to box 309.

In box 309, the content access application 179 obtains a content item initial portion 121 (FIG. 1A) from the content server 139 (FIG. 1C). In box 312, the content access application 179 obtains content item metadata 124 (FIG. 1A) from the content server 139. Such content item metadata 124 may include, for example, manifests 155 (FIG. 1C), decryption keys 157 (FIG. 1C), and/or other metadata. In cases where a shared starting sequence is less than a necessary initial portion, the content access application 179 may obtain a subsequent portion unique to the content item that follows the shared starting sequence in order to fill a buffer and facilitate instantaneous playback. In box 315, the content access application 179 initializes various components in the client 106 to facilitate use of the content items. This may include, for example, launching and/or initializing decoding components 183 and/or decryption components 185, storing decryption keys 157 in the secure data store 187, and/or performing other tasks.

It is noted that performing the tasks of boxes 309-315 may delay playback of the content item relative to the case in which the content item has been predictively cached. The content access application 179 then continues to box 318. If the content access application 179 determines that the content item has been predictively cached in box 306, the content access application 179 moves to box 318.

In box 318, the content access application 179 begins use of the content item. If the content item was predictively cached, an instantaneous use experience is provided as the delay-inducing tasks of boxes 309-315 were performed in advance. In some cases, the content access application 179 may be configured by metadata to apply some type of correction or filtering (e.g., volume, brightness, contrast, hue, gamma, saturation, etc.) to the initial portion of the content item in order to match or minimize differences between the initial portion and the rest of the content item. In other situations, the correction may be applied to the rest of the content item rather than the initial portion. In box 321, the content access application 179 determines whether more data for the content item remains to be streamed or downloaded. If no more data remains, the portion of the content access application 179 ends. If use is not finished, the content access application 179 instead continues to box 324 and obtains a content item subsequent portion 127 (FIG. 1A) from the content server 139. The content item subsequent portion 127 may be identified through processing the manifest 155 for the content item. In box 327, the content access application 179 plays back the content item subsequent portion 127. The content access application 179 then returns to box 321 and determines again whether more data remains to be streamed or downloaded.

Figure 4:
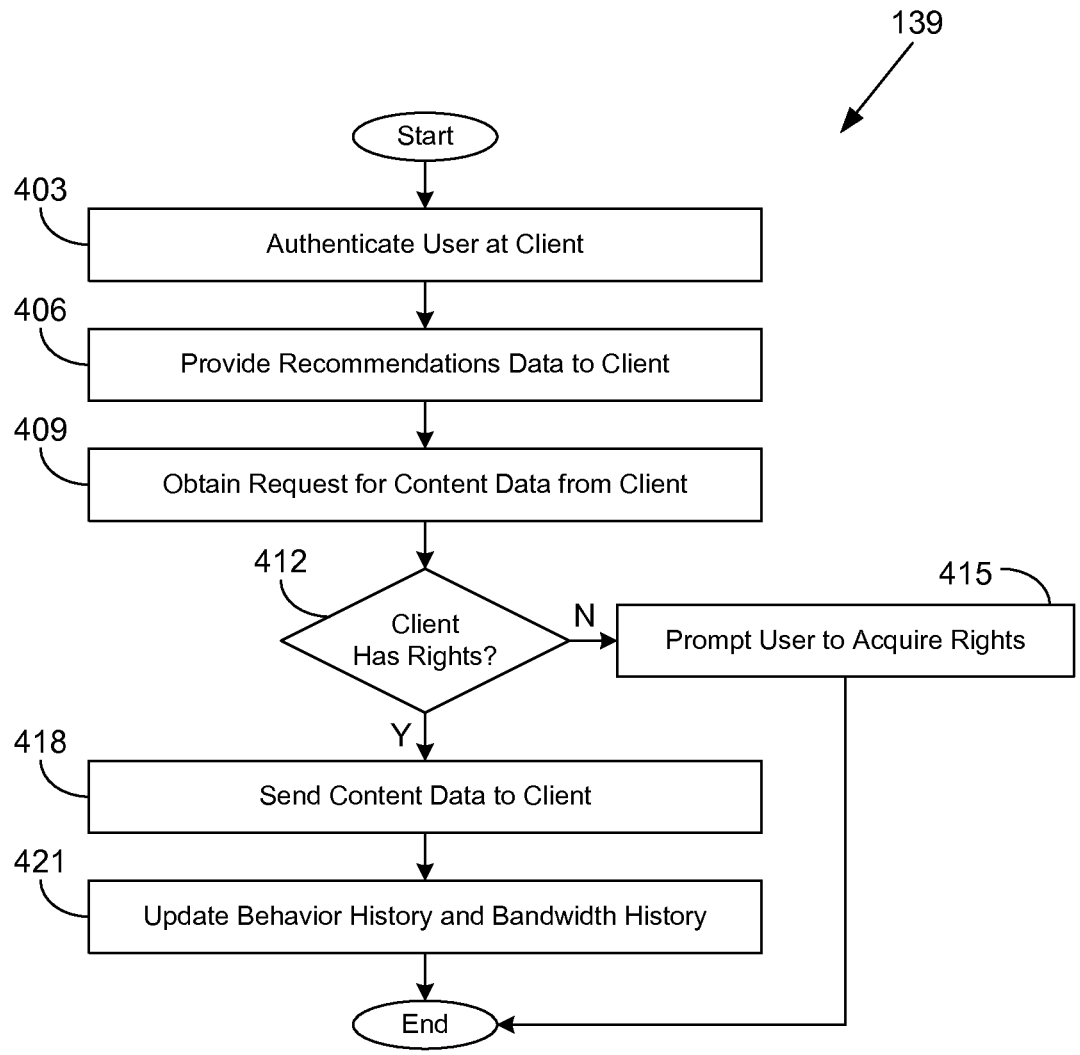
FIG. 4 is a flowchart illustrating one example of functionality implemented as portions of a content server executed in a computing environment in the networked environment of FIG. 1C according to various embodiments of the present disclosure.

Moving on to FIG. 4, shown is a flowchart that provides one example of the operation of a portion of the content server 139 (FIGS. 1A & 1C) according to various embodiments. It is understood that the flowchart of FIG. 4 provides merely an example of the many different types of functional arrangements that may be employed to implement the operation of the portion of the content server 139 as described herein. As an alternative, the flowchart of FIG. 4 may be viewed as depicting an example method implemented in the computing environment 103 (FIGS. 1A & 1C) according to one or more embodiments.

Beginning with box 403, the content server 139 authenticates a user at a client 106 (FIGS. 1A & 1C). In some cases, the user may be associated with a subaccount. The authentication may be performed by a cookie, by a username/password combination, and/or by another security credential. In box 406, the content server 139 provides recommendations data 142 (FIG. 1C) to the client 106. In some cases, the content server 139 may provide directives to the client 106 to predictively cache certain content items. In box 409, the content server 139 obtains a request for content data 145 (FIG. 1C) from the client 106. The request may be for content portions 153 (FIG. 1C), manifests 155 (FIG. 1C), decryption keys 157 (FIG. 1C), and/or other content data 145.

In box 412, the content server 139 determines whether the client 106 has rights to the content item to which the content data 145 pertains. If not, the content server 139 may prompt the user to acquire the rights in box 415. For example, the content server 139 may send data encoding a user interface 108 (FIGS. 1A & 1C) to the client 106, where the user interface 108 prompts the user to purchase the content item or a subscription. Thereafter, the portion of the content server 139 ends. In some cases, the encrypted content portions 153 and manifests 155 may be sent to the client 106 without the decryption key 157 if the client 106 does not have the rights.

If the client 106 does have the rights, the content server 139 moves from box 412 to box 418 and sends the content data 145 to the client 106 over the network 107 (FIGS. 1A & 1C). In some cases, the content server 139 may select from multiple bitrates for the content portions 153, multiple languages in the content portions 153, and/or other alternatives based on data such as bandwidth history 164 (FIG. 1C), content preferences 166 (FIG. 1C), etc. The bitrate may be adaptive based at least in part on the currently available bandwidth for the client 106. In box 421, the content server 139 updates the behavior history 160 (FIG. 1C), the bandwidth history 164 (FIG. 1C), and/or other data. Thereafter, the portion of the content server 139 ends.

Figure 5:
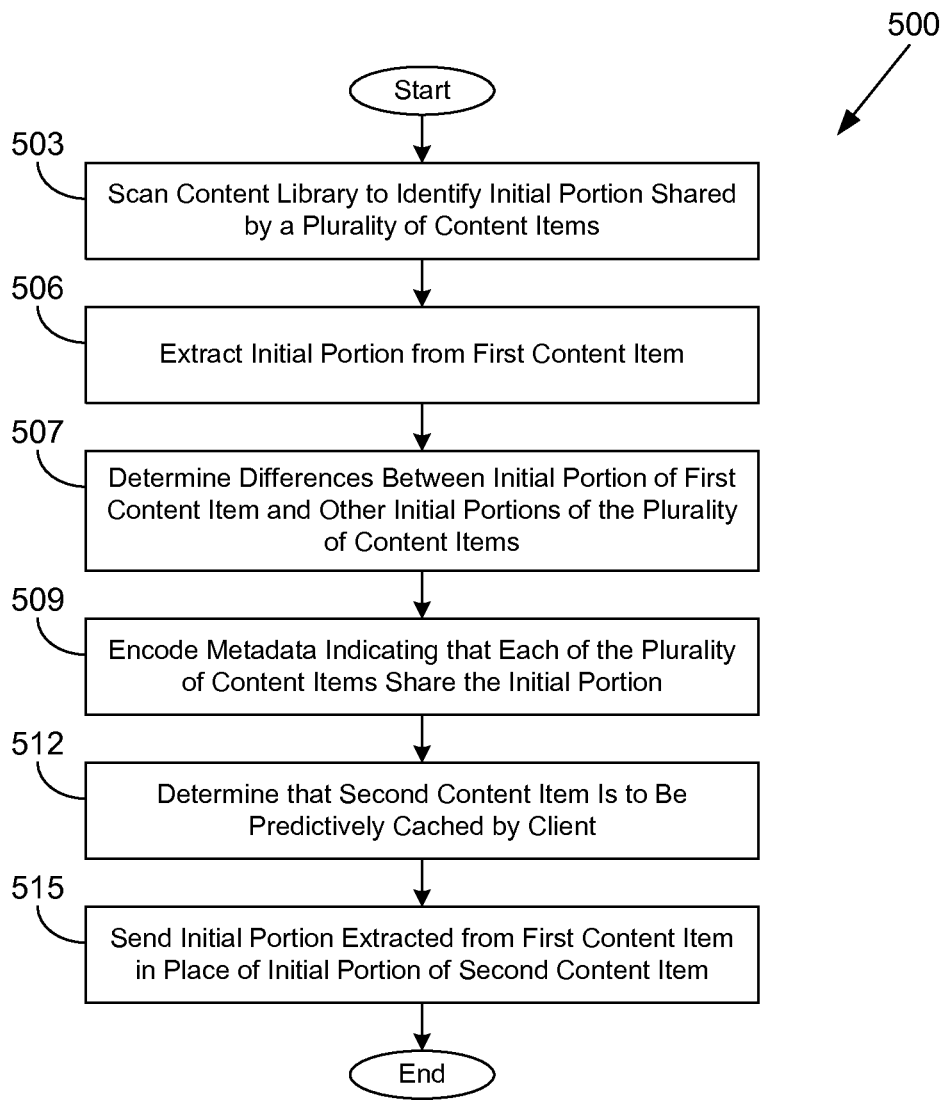
FIG. 5 is a flowchart illustrating one example of functionality implemented as portions of a content server and a starting sequence analysis engine executed in a computing environment in the networked environment of FIG. 1C according to various embodiments of the present disclosure.

Referring next to FIG. 5, shown is a flowchart 500 that provides one example of the operation of portions of the starting sequence analysis engine 140 (FIG. 1C) and the content server 139 (FIG. 1C) according to various embodiments. It is understood that the flowchart of FIG. 5 provides merely an example of the many different types of functional arrangements that may be employed to implement the operation of the portion of the starting sequence analysis engine 140 and the content server 139 as described herein. As an alternative, the flowchart of FIG. 5 may be viewed as depicting an example of elements of a method implemented in the computing environment 103 (FIG. 1C) according to one or more embodiments.

Beginning with box 503, the starting sequence analysis engine 140 scans the content library 151 (FIG. 1C) to identify an initial portion that is shared by a plurality of content items. In doing so, the starting sequence analysis engine 140 may perform video content comparisons between all or a subset of initial portions of the content items in the content library 151. The comparisons may be performed via a fuzzy matching approach, as configured by the starting sequence configuration data 173 (FIG. 1C), to account for slight variations in encoding, recording, or filming associated with different content items. In some cases, a previously recognized initial portion may be profiled in the starting sequence signatures 172 (FIG. 1C), and the starting sequence analysis engine 140 may evaluate a given content item to determine whether its initial portion matches a known starting sequence signature 172.

The starting sequence analysis engine 140 may analyze only a subset of the content library 151 to determine whether their starting sequences match one another. The selection of the subset may be based at least in part on metadata indicating that the content items correspond to the same category 159 (FIG. 1C) (e.g., episodes of a particular season of a video content series) or originate from a same source 158 (FIG. 1C) (e.g., the same movie studio, the same content producer, etc.). Content items matching such criteria may be more likely to share initial portions or starting sequences.

Where the content items correspond to video with a corresponding audio track, in some cases, the starting video sequence may be shared among multiple content items, while the starting audio sequence may not. Alternatively, the starting audio sequence may be shared among multiple content items, while the starting video sequence may not. In such cases, the shared video and/or audio may be sent and predictively cached separately from the video and/or audio that pertains to the particular content item. In some cases, the video and/or audio from an initial portion may be shared among different sets of content items.

In some situations, an external data provider may provide metadata indicating which content items share the same starting sequence. For example, a movie studio may provide metadata indicating that a set of movies include the same starting sequence. In another situation, manual review may be employed to determine whether starting sequences are shared.

In box 506, the starting sequence analysis engine 140 extracts the initial portion from a first content item of the plurality of content items. In box 507, the starting sequence analysis engine 140 determines any differences that exist between the initial portion extracted from the first content item and the initial portions of the other content items of the plurality of content items. Although the starting sequences may have identical content, the actual video may differ in brightness, gamma, contrast, hue, saturation, tint, and/or other factors. Similarly, the actual audio may differ by volume. In box 509, the starting sequence analysis engine 140 encodes shared starting sequence data 174 (FIG. 1C), including metadata indicating that each of the plurality of content items share the same initial portion. The metadata may also encode the differences determined in box 507. Where differences exist, the content access application 179 (FIG. 1C) may be configured to gamma correct, color correct, volume adjust, etc., the initial portion according to the differences in the metadata to match or minimize differences with the rest of the content item. The corresponding manifests 155 (FIG. 1C) may be updated to point to the same content portion 153 for the various content items that share the initial portion. The shared starting sequence data 174 and/or the manifests 155 may be sent to the clients 106 so that, in some embodiments, the client 106 is made aware of the shared nature of the initial portions. In one embodiment, the client 106 obtains metadata associated with some or all of the content items that share the initial portion.

In box 512, the content server 139 determines that a second content item of the plurality of content items is to be predictively cached by a client 106 (FIG. 1C). In box 515, the content server 139 sends the initial portion extracted from the first content item to the client 106 via the network 107 (FIG. 1C) in place of the initial portion of the second content item. Subsequently, the content server 139 may avoid sending initial portions for other content items that share the same initial portion sent in box 515 and cached by the client 106. In such a scenario, the content server 139 may instruct the client 106 to use the copy of the initial portion previously cached for the second content item. In cases where the shared initial portion is relatively short, the content server 139 may send a subsequent portion of the second content item to the client 106 for predictive caching purposes. Thereafter, the flowchart 500 ends.

Figure 6:
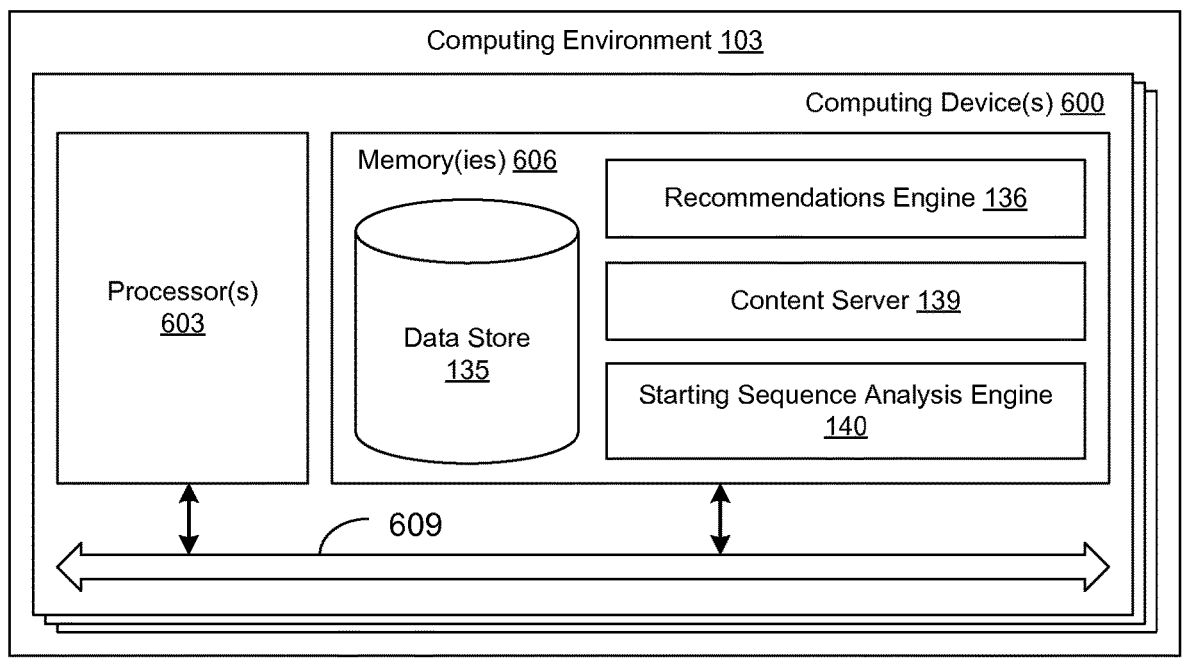
FIG. 6 is a schematic block diagram that provides one example illustration of a computing environment employed in the networked environment of FIGS. 1A and 1C according to various embodiments of the present disclosure.

With reference to FIG. 6, shown is a schematic block diagram of the computing environment 103 according to an embodiment of the present disclosure. The computing environment 103 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are a recommendations engine 136, a content server 139, a starting sequence analysis engine 140, and potentially other applications. Also stored in the memory 606 may be a data store 135 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603.

Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the recommendations engine 136, the content server 139, the starting sequence analysis engine 140, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2-5 show the functionality and operation of an implementation of portions of the recommendations engine 136, the content server 139, the starting sequence analysis engine 140, the content access application 179 (FIG. 1C), and the predictive caching system 181 (FIG. 1C). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 2-5 show a specific order of execution, it is understood that the order of execution may differ from that which is depicted. For example, the order of execution of two or more blocks may be scrambled relative to the order shown. Also, two or more blocks shown in succession in FIGS. 2-5 may be executed concurrently or with partial concurrence. Further, in some embodiments, one or more of the blocks shown in FIGS. 2-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the recommendations engine 136, the content server 139, the starting sequence analysis engine 140, the content access application 179, and the predictive caching system 181, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the recommendations engine 136, the content server 139, the starting sequence analysis engine 140, the content access application 179, and the predictive caching system 181, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 103.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   scan a video content item library to identify a starting sequence shared by a plurality of video content items;
   extract the starting sequence from a first video content item of the plurality of video content items;
   determine, for each respective video content item of the plurality of video content items other than the first video content item, a respective correction to be applied to the starting sequence or a subsequent portion of the respective content item, the respective correction being determined in order to minimize differences between the starting sequence and the subsequent portion of the respective content item;
   encode metadata indicating that each of the plurality of video content items share the starting sequence and indicating the respective corrections for the plurality of video content items other than the first video content item;
   send the metadata to a client prior to a user at the client indicating that playback of a second video content item of the plurality of video content items is desired;
   receive a first request from the client to cache the starting sequence prior to the user at the client indicating that playback of the second video content item of the plurality of video content items is desired;
   send the starting sequence that has been extracted from the first video content item to the client in response to the first request;
   receive a second request from the client to stream the second video content item, the second request being in response to the user at the client indicating that playback of the second video content item is desired;
   send the second video content item beginning after the starting sequence to the client in response to the second request;
   cause the client to apply the respective correction from the metadata for the second video content item to the starting sequence or a subsequent portion of the second video content item; and
   cause the client to remove at least one of: the metadata or the starting sequence that has been extracted from the first video content item in response to expiration of a decryption key associated with the first video content item.

2. The non-transitory computer-readable medium of claim 1, wherein scanning the video content item library further comprises comparing an initial portion of the first video content item to an initial portion of the second video content item.

3. The non-transitory computer-readable medium of claim 1, wherein when executed the program further causes the at least one computing device to at least identify the first video content item and the second video content item for comparison based at least in part on the first video content item and the second video content item corresponding to two episodes of a particular video content series or the first video content item and the second video content item originating from a particular source entity.

4. A system, comprising:
   a computing device; and
   a predictive caching system executable in the computing device, wherein when executed the predictive caching system causes the computing device to at least:
   obtain a list of recommended content items for a user;
   select a first content item of the recommended content items from the list;
   obtain an initial portion of the first content item from at least one server prior to the user explicitly indicating that use of the first content item is desired, wherein the initial portion has been extracted from a second content item that shares the initial portion;
   obtain metadata from the at least one server prior to the user explicitly indicating that the use of the first content item is desired, wherein the metadata specifies a correction to be applied to the initial portion or a subsequent portion of the first content item in order to minimize differences between the initial portion and the subsequent portion;
   perform processing to prepare the computing device for the use of the first content item prior to the user explicitly indicating that the use of the first content item is desired, wherein the processing includes applying the correction to the initial portion or the subsequent portion of the first content item; and
   perform processing to remove at least one of: the metadata or the initial portion that has been extracted from the second content item in response to expiration of a decryption key associated with the first content item or the second content item.

5. The system of claim 4, wherein the first content item corresponds to an episode of a video content series, the second content item corresponds to another episode of the video content series, and the initial portion is an introductory sequence for the video content series.

6. The system of claim 4, wherein the first content item and the second content item originate from a particular source entity, and the initial portion identifies the particular source entity.

7. The system of claim 4, wherein the processing to prepare the computing device for the use of the first content item is relative to the metadata.

8. The system of claim 4, wherein when executed the predictive caching system further causes the computing device to at least obtain additional metadata indicating respective corrections for the initial portion for a plurality of other content items that share the initial portion.

9. The system of claim 4, wherein when executed the predictive caching system further causes the computing device to at least:
    receive a request to use a third content item;
    determine that the third content item shares the initial portion; and
    commence instantaneous playback of the third content item using the initial portion that has previously been obtained for the first content item.

10. The system of claim 4, wherein the first content item is selected based at least in part on a priority of the first content item and an available memory of the computing device.

11. The system of claim 4, wherein when executed the predictive caching system further causes the computing device to at least:
    select a third content item from the list based at least in part on the third content item also sharing the initial portion; and
    perform processing to prepare the computing device for use of the third content item prior to the user explicitly indicating that the use of the third content item is desired.

12. The system of claim 4, wherein when executed the predictive caching system further causes the computing device to at least obtain a subsequent portion of the first content item from the at least one server prior to the user explicitly indicating that the use of the first content item is desired, the subsequent portion of the first content item not being shared with the second content item.

13. The system of claim 4, wherein the correction comprises at least one of: a gamma correction, a color correction, or a volume correction.

14. A method, comprising:
    scanning, via at least one computing device, a content item library to identify an initial portion shared by a plurality of content items based at least in part on first metadata indicating that the initial portion is shared by the plurality of content items;
    extracting, via the at least one computing device, the initial portion from a first content item of the plurality of content items;
    determining, via the at least one computing device, that a second content item of the plurality of content items is to be predictively cached by a client;
    generating, via the at least one computing device, second metadata that specifies a correction to be applied to the initial portion or a subsequent portion of the second content item in order to minimize differences between the initial portion and the subsequent portion of the second content item;
    sending, via the at least one computing device, before a user associated with the client has indicated use of the second content item, the second metadata and the initial portion extracted from the first content item to the client in place of the initial portion of the second content item; and
    causing, via the at least one computing device, the client to remove the metadata and the initial portion extracted from the first content item in response to expiration of a decryption key associated with the first content item.

15. The method of claim 14, wherein determining that the second content item is to be predictively cached by the client further comprises selecting, via the at least one computing device, the second content item from a list of recommended content items for the user associated with the client based at least in part on a priority associated with the second content item.

16. The method of claim 14, further comprising:
    sending, via the at least one computing device, a subsequent portion of the second content item to the client; and
    configuring, via the at least one computing device, the client to use both the initial portion extracted from the first content item and the subsequent portion of the second content item for predictive caching of the second content item.

17. The method of claim 14, further comprising:
    determining, via the at least one computing device, that a third content item of the plurality of content items is to be predictively cached by the client; and
    instructing, via the at least one computing device, the client to use a cached copy of the initial portion extracted from the first content item for predictive caching of the third content item.

18. The method of claim 14, wherein scanning the content item library further comprises identifying, via the at least one computing device, the plurality of content items based at least in part on the first metadata indicating that the plurality of content items correspond to a particular season of a video content series.

19. The method of claim 14, wherein scanning the content item library further comprises identifying, via the at least one computing device, the plurality of content items based at least in part on the first metadata indicating that the plurality of content items originate from a particular source entity.

20. The method of claim 14, wherein scanning the content item library further comprises performing, via the at least one computing device, a video content comparison among the initial portions of the plurality of content items.

* * * * *